United States Patent

[11] 3,589,799

| [72] | Inventor | John E. Hotchkiss |
| | | Corte Madera, Calif. |
| [21] | Appl. No. | 796,875 |
| [22] | Filed | Feb. 5, 1969 |
| [45] | Patented | June 29, 1971 |
| [73] | Assignee | Hotchkiss Instruments, Inc. |

[54] OPTICAL SYSTEM FOR ILLUMINATION AND VIEWING OF AN AREA
4 Claims, 4 Drawing Figs.

[52] U.S. Cl. .................................................. 350/237,
351/16, 128/4, 128/22
[51] Int. Cl. ........................................................ G02b 27/02
[50] Field of Search............................................ 350/27–
—29, 35, 50, 52, 91, 237, 288, 293, 199; 351/1, 6,
7, 13, 16, 14; 356/154, 241; 128/4, 7, 8, 9, 22, 395,
397, 398

[56] References Cited
UNITED STATES PATENTS
| 2,457,170 | 12/1948 | Mitchell ........................ | 356/163 |
| 2,651,237 | 9/1953 | Garutso......................... | 350/197 |
| 2,777,364 | 1/1957 | Murray.......................... | 351/14 |
| 2,823,666 | 2/1958 | Hallpike....................... | 350/91 |
| 3,066,569 | 12/1962 | MacDonald................. | 350/294 |

Primary Examiner—David Schonberg
Assistant Examiner—Michael J. Tokar
Attorney—Warren, Rubin, Brucker & Chickering ABSTRACT: An optical system for the concomitant illumination and viewing of recessed areas which is particularly suited for incorporation into an endoscope is disclosed. The optical viewing system is preferably formed for coincident illumination and viewing by the placement of a reflective viewing surface on the focal axis of an illuminating beam between the light source and the area to be viewed. Additionally, a reflective viewing system is preferably provided which achieves the visual sensation of "looking through" the light beam producing illuminating system and down the focal axis of the beam. Additionally, a pair of reflective surfaces is employed to achieve binocular viewing. Illumination of the viewing area is preferably achieved by an illumination system which includes a beam-reinforcing reflector means, which directs substantially all of the light into a focused illuminating beam and thereby intensifies the beam.

PATENTED JUN29 1971 3,589,799
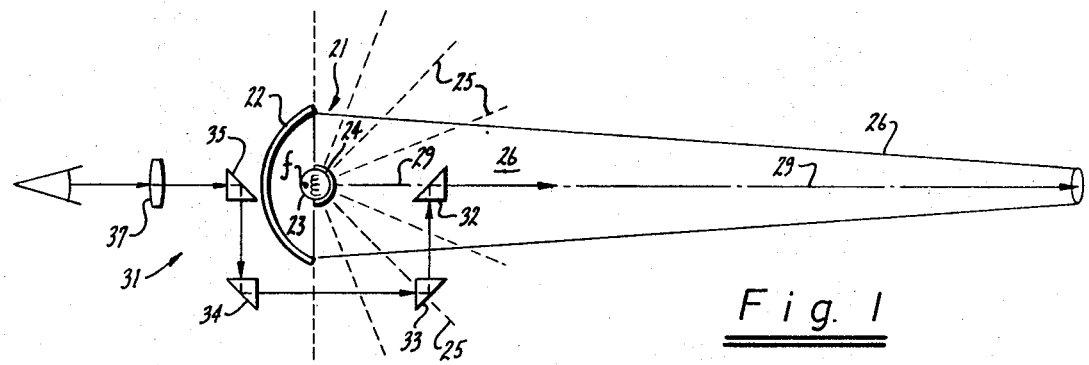
Fig. 1
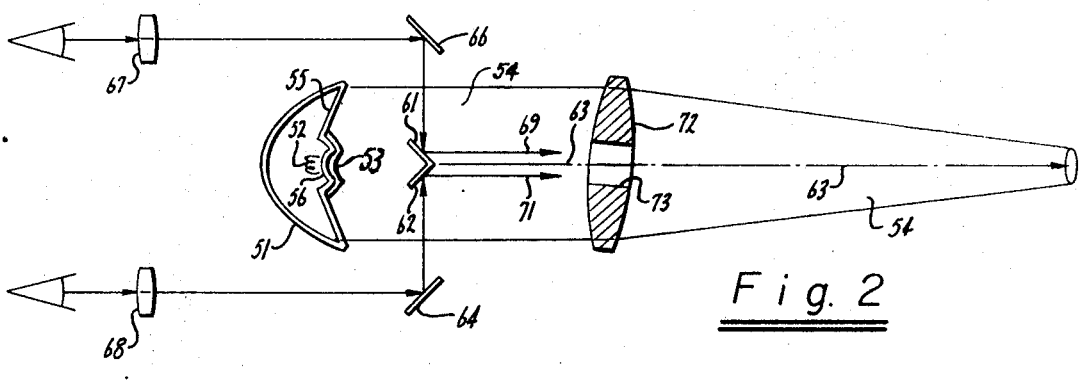
Fig. 2
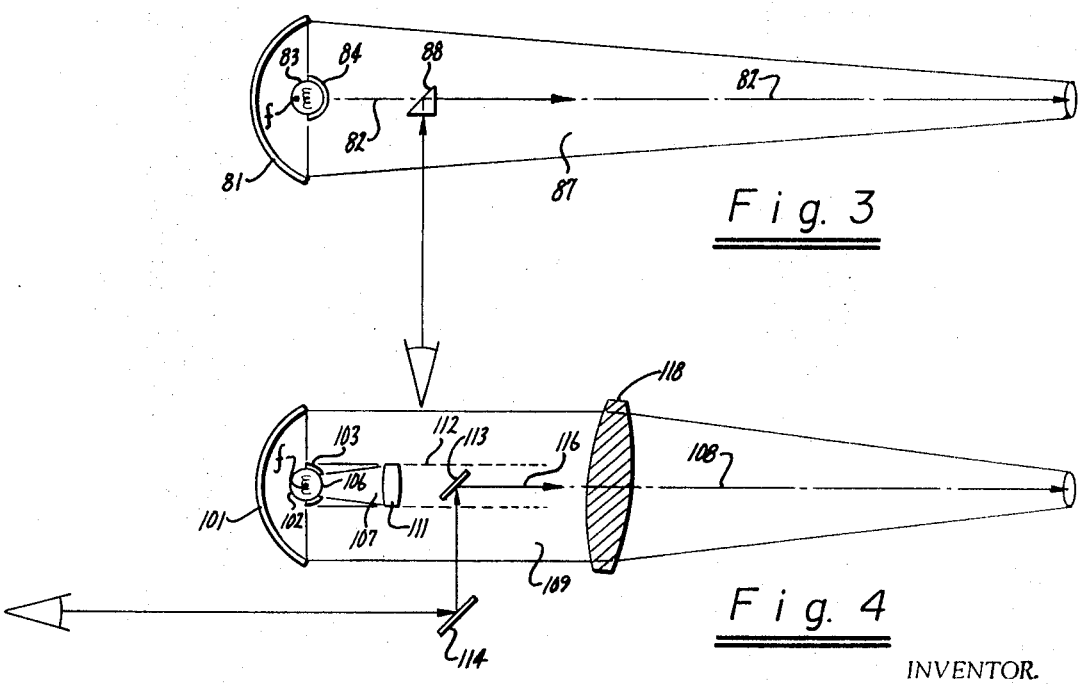
Fig. 3
Fig. 4
INVENTOR.
John E. Hotchkiss
BY Warren, Rubin, Brucker & Chickering Attorneys

OPTICAL SYSTEM FOR ILLUMINATION AND VIEWING OF AN AREA

BACKGROUND OF THE INVENTION

This invention relates to optical systems for use in medical, industrial and scientific instruments and more particularly for use in endoscopes.

There are several scientific and medical instruments which are hand held or portable and are constructed so as to enable the simultaneous illumination and viewing of an area. Among these instruments are endoscopes, including otoscopes used for examination of the ear canal and tympanic membrane, and head mirrors, which do not normally contain their own light source. These devices are typically employed in the medical field, however, analogous instruments are used in viewing crevices or recesses in industrial applications, for example, the inspection of parts or equipment.

Several problems have been found to exist in each one of these devices. Among these problems is achieving maximum illumination of the recessed area while still maintaining the instrument as small and compact in size as possible. In some applications it has also been found that it is highly advantageous, if not absolutely necessary, to provide an optical system which is capable of coincident or coaxial illumination and viewing of the desired area. A coaxial system enables illumination and viewing of deep narrow recesses, which is not possible in other systems due to troublesome parallax. Still further, it has been found that most prior optical systems commonly employed for the viewing of recessed areas have the disadvantage of not allowing for depth perception. Possible exceptions are some microscopes and indirect opthalmoscopes. Prior microscopes and opthalmoscopes, however, are not coaxially illuminated, which limits the depth of the recess in which the instruments can be effectively employed, are very bulky and accordingly sometimes awkward to manipulate, are expensive, require external power sources, and usually they must be plugged into a hospital electrical outlet. Thus, binocular viewing of the surface area with a compact, portable instrument, and more particularly, binocular viewing coincident with the illumination of the surface area, is highly desirable.

SUMMARY OF THE INVENTION

The present invention provides an optical system for use with medical and scientific instruments in which there is improved illumination and viewing of the area to be examined.

In order to achieve improved viewing of the illuminated area, the optical system of the present invention is provided with an optical viewing means formed and positioned to achieve the visual sensation of "looking through" the illuminating system and coaxially down the illuminating beam. Thus, the viewing system is preferably constructed so that the illuminating system seems to be "transparent" and the viewer can see exactly the same area as the seam illuminates.

In order to achieve improved illumination, the optical system of the present invention is comprised, briefly, of a light source and reflector, formed to produce a beam of light to be directed on the area to be viewed, and a reinforcing or boosting reflector means disposed adjacent the light source and beam-producing reflector and formed to prevent emission of light from the light source and beam-producing reflector in a direction substantially transverse to the beam and to reflect this normally wasted light for emission as part of the beam. Still further, the optical system of the present invention may be provided with a viewing means which includes a reflective surface means disposed for binocular viewing of the recessed area, preferably with the surface means formed as a pair of surfaces positioned on either side of the focal axis of the beam.

BRIEF DESCRIPTION OF THE DRAWING

FIG. 1 is a schematic representation of an optical system constructed in accordance with the present invention.

FIG. 2 is a schematic representation of an alternative embodiment of the optical system of the present invention.

FIG. 3 is a schematic representation of another alternative embodiment of the optical system of the present invention.

FIG. 4 is a schematic representation of another alternative embodiment of the optical system of the present invention.

DESCRIPTION OF THE PREFERRED EMBODIMENTS

Referring to FIG. 1, the optical system of the present invention can be seen to be comprised of a light source and reflective means, generally designated 21, which is comprised of a concave beam-focusing reflective surface 22 and a light source 23, which is preferably electrically powered. Extending around light source 23 is a boosting or reinforcing reflector means 24, which is formed to cause virtually all of the light from the filament to be emitted in a focused beam 26 after reflection off beam focusing reflector 22. This is an important aspect of the present invention which will be described hereinafter in detail; however, the viewing system of the present invention can be advantageously employed in optical systems which do not include boosting reflector 24. Accordingly, the viewing system which does not incorporate a boosting reflector and later in combination with a system which does have a boosting reflector.

Viewing is preferably accomplished with the optical axis of the viewing system coincident with the focal axis of the illumination system. Thus, viewing means, generally designated 31, is comprised of four reflecting surfaces, in this embodiment prisms 32—35, and lens 37. Prism 32 is disposed upon focal axis 29 of reflector 22 with prism 32 through 35 being oriented so that the optical axis of optical viewing means 31 coincides with focal axis 29. Moreover, and very importantly, viewing of exactly the same area as is illuminated by the beam is achieved form a position directly behind illuminating means 21 and physically aligned with optical axis 29. Alignment of the eyepiece with the beam has the resultant advantage of allowing an instrument, into which the may be incorporated, to be rapidly brought into general alignment with the recessed area to be viewed. The viewer has the sensation of looking through reflector 22 and light source 23, almost giving a "transparent" quality to them. This in turn allows the user to have a more natural feeling for the orientation and relationship of the viewing instrument, the recess viewed, and other instruments or tools which may be used while viewing the recessed area. The use of the four-prism viewing system as illustrated in FIG. 1 has the additional advantage of extending the viewing path. This extension of the viewing path is achieved by in effect folding the path into a compact area and allows greater magnification of the target area to be achieved more economically than would otherwise be possible. Other reflective systems with greater or fewer reflective surfaces can be provided which will fold the light to allow viewing "through" reflector 22 to facilitate maximum dexterity in the manipulation of the instrument. When boosting reflector 24 is added to the illumination system, the above-described viewing system will be seen to still provide the sensation of looking through the illumination system, although now the illuminating beam will be boosted.

The improved illumination system of the present invention can be described in detail by reference to FIG. 1, wherein reflector 22 is illustrated as a portion of the periphery of a circle, which illustration is intended to represent a spherical concave mirror. Light source 23 is preferably located substantially at or slightly beyond the focal point $f$ of the spherical mirror. When the light source is located at focal point $f$, the light beam produced will be substantially circular in cross section with the rays emanating substantially parallel to the focal axis of the mirror. Light source 23, however, is preferably positioned to cause the beam to converge toward the focal axis, as illustrated in FIG. 1. Beam 26, boosted or reinforced by light reflected from surface 24 and focused by location of the light relative to mirror 22, will be of substantially uniform high intensity at the area upon which the beam is focused.

Use of a boosting reflector will prevent emission of light transverse to the beam, as represented by radiating broken lines 25. When incorporated into many instrument configurations, light radiating as illustrated by rays 25 would cause undesirable reflections in the instrument. Moreover and very importantly, reinforcing reflector 24 prevents the loss or wasting of light (represented by rays 25) which would emanate transverse to beam 26. It has been found that the use of an illumination system wherein light source 23 is not provided with a reinforcing reflector will result in substantial inefficiency in illumination by reason of emission of light transverse to the beam, which light is never focused on the viewing area and is in effect wasted. Reflector 24 is preferably formed so as to cause the light shielded and reflected to pass through the same point that the filament is located. Light passing through the filament will be reflected into a converging beam 26 and uniformly increase the beam's intensity. When the filament is located at focal point $f$, light will be reflected into a parallel beam.

The illumination system hereinabove described enables a maximum utilization of the light emanated from source 23 and therefore a minimization of the power requirement and size of the source as well as the heat generated thereby. As will be understood, it is very important in many applications that the light source and reflector means be as compact as possible in order that the instrument may be easily manipulated in a relatively small space. Since it is often advantageous or necessary that the instrument be entirely portable, the size of the batteries or other energy source used to drive the light should also be minimal. Moreover, excessive heat generation cannot be tolerated in many instruments.

It is also an important feature of the optical system of the present invention to be able to view the recessed area or cavity with depth perception or three-dimensional viewing. The construction of the optical system of the present invention in order to allow viewing with depth perception may best be understood by reference to FIG. 2. Mounted in front of paraboilodal reflector 51, schematically represented, is an electrical light filament 52 with an oppositely facing boosting reflector 53. Reflector 53 is formed as a separate member from the light source and is mounted a spaced distance therefrom on a transparent member 55, preferably glass. Member 55 and reflector 51 encapsulate filament 52 to act as a bulb and provide a unitary light source, beam focusing reflector and reinforcing reflector. Such a unitary construction is highly advantageous since it greatly facilitates replacement of the light source without disturbing the illuminating geometry. The booster reflector, as is true of reflector 24 in the apparatus of FIG. 1, extends as a spherical segment over a substantial area to enclose the light source and prevent emission of light except by reflection off beam-focusing reflector 51. The light, therefore, is directed into a focused beam 54. If filament 52 is mounted at the focal point of the paraboilodal reflector, beam 54 will emanate parallel to the focal axis of the reflector. Filament 52 is preferably located at the focal point of reflector 51 and the center of curvature of spherical reinforcing reflector 53 is also at the focal point of reflector 51 to give maximum and uniform reinforcement of the intensity of beam 54. In addition, reinforcing reflector 53 is provided with a spherical protrusion 56 to cause light to be reflected radially to the sides of beam reflector 51. This avoids light loss which occurs by reason of light which is reflected off of the center of beam reflector 51 and blocked by booster reflector 53 or reflected by booster reflector 53 to the center of beam reflector 51. Protrusion 56 will cause light reflected off of beam reflector 51, as well as light emanated directly from filament 52, to be reflected off the sides of beam reflector 51 and emanate as a part of beam 54. This construction further reinforces the beams's intensity.

In order to obtain depth perception, the optical means illustrated in FIG. 2 is formed as two side-by-side surfaces 61 and 62 which are disposed on either side of the focal axis 63 of beam 54 and positioned and extending to allow spaced-apart convergent viewing of the recessed area. Reflective surfaces 61 and 62 are additionally preferably provided with optically aligned reflective surfaces 64 and 66 which are positioned outside the beam and lenses 67 and 68 in order to enable binocular viewing of said area substantially coincident with the focal axis 63 of reflector 51. Surfaces 61 and 62 can be formed as one continuous member or surface having two viewing areas thereon. It is preferable to form surfaces 61 and 62 at 90° to each other and to them at 45° to the focal axis of the beam, although variation from these angles is possible while still affording stereoscopic viewing.

An otoscope, which is an instrument in which the improved optical system of the present invention can be advantageously employed, illustrates the advantages of having a binocular viewing system to overcome the depth perception problem. When viewing through an otoscope, it is of critical importance to be able to accurately gauge the distance between a scalpel or other instrument and the tympanic membrane. Stereoscopic viewing of the tympanic membrane will greatly improve the ease of manipulation of such instruments and reduce the danger of inadvertent damage to the membrane.

A lens 72 may be provided to condense beam 54. Condensing lens 72 is preferably inclined at an angle to focal axis 63 in order to minimize the reflection of beam 54 back into the optical viewing means. Additionally, lens 72 may be formed with a centrally disposed opening 72 therethrough. As formed in FIG. 1, the condensing lens will function to magnify the image which is viewed through the optical viewing means. In FIG. 3, lens 72 will still condense beam 54; however, since lens 72 would also limit the depth of focus of the viewing system, opening 73 affords an unlimited depth of view.

It is an additional important feature of the optical system of the present invention to enable depth perception through the binocular optical viewing means even in optical systems wherein the illumination of viewing area is not achieved by the use of a boosting reflector as herein described. In some instruments, for example, the size of the light and power source may not be of critical importance and yet viewing of crevices, cavities and recesses with the ability to perceive depth may be of utmost importance.

Another important feature of the optical system of the present invention can be best understood by reference to a specific instrument into which it may be incorporated. In the medical profession a head mirror is commonly and frequently employed in which an external light source is reflected off a concave mirror mounted on the doctor's head. The mirror may be positioned down over the eye and has a central opening therein so that the doctor may view through the focal axis of the mirror onto the desired area of the patient's anatomy. One problem encountered with such mirrors is that an external light source which is to be reflected off the mirror is not always available which is adequate or suitable for the purpose. Another important problem that has been encountered is that the doctor's eye is located so close to the opening in the concave mirror that his line of sight can readily diverge angularly from the focal axis of the mirror. Thus, use of head mirrors requires some considerable practice and agility or coordination in order to cause the beam to be focused upon the desired area.

In each of the optical viewing means illustrated herein, however, the beam of light produced will always be in alignment with the optical viewing path. Thus, if the optical viewing system of FIG. 2 were to be incorporated in a head mirror, having a self-contained light source, manipulation of the head mirror would be much more easily accomplished than with conventional head mirrors by reason of the alignment of the viewing means with the illumination means. It is impossible, for example, to look into an instrument constructed in accordance with FIG. 2 in a direction which diverges from the path of beam 54. The optical viewing means, by utilizing spaced reflectors, achieves a fixed line of sight in a manner analogous to looking down a tube, as opposed to looking through a hole in a thin sheet of material. Thus, unlike a head mirror, the optical system of the present invention may be easily directed to the desired viewing area. As will also be understood, incorporation of the optical systems herein described, and particularly a binocular viewing and self-contained illumination system, into a compact instrument which can be easily adapted to be carried on a strap around the head of a doctor or affixed to eyeglass frames can be readily achieved. Moreover, optical systems of the present invention can be easily and conveniently incorporated into instruments mounted on a movable arm or other supporting device for use by hobbyists or industrial inspectors.

As illustrated in FIG. 3, viewing in the optical system of the present invention may be achieved by looking into the viewing system in a direction perpendicular to the illuminating beam. In some instruments such a relationship between the viewing and illumination system is extremely desirable. In FIG. 3 concave focusing reflector 81 is again illustrated as a segment of its spherical reflector. Mounted on the optical axis 82 of reflector 81 is a light source 83 having boosting reflector means 84. Mounted adjacent light source 83 is a prism 88 having a reflective surface aligned with focal axis 82. Viewing down axis 82 through prism 88 is preferably achieved by viewing from a position outside beam 87 so that the beam is uninterrupted from the viewing position to the axially disposed prism 88. Convergence of beam 87 is achieved by means of positioning of light source 83 and the configuration of reflector 81. Thus, if a spherical reflector is used, positioning the light source on the side of the focal point of the spherical mirror away from the mirror will tend to cause the beam to converge. The rate of convergence can be determined by selection of the distance of the light source of the reflector and the radius of curvature of the reflector.

FIG. 4 illustrates a schematic representation of another embodiment of the present invention wherein reflector 101 has light source 102 mounted at the focal point of the reflector. Reflector 101 is here represented to be a spherical reflector. Mounted or coated on the exterior surface of the light bulb 102 is a boosting reflector 103 formed as a spherical band. Reflector 103 defines a circular opening 106 which allows emission of a light beam 107 directly along the focal axis 108 of reflector 102. In addition, a beam of light 109 is reflected off of concave surface 101. Mounted a spaced distance from light source 102 on focal axis 108 is a condensing lens 111, which is formed to collect diverging beam 107 and focus it parallel to beam 109 so that beams 107 and 109 are substantially parallel and coterminus at innerface 112. Located beyond the lens 111 on the focal axis 108 is a viewing reflector 113 positioned adjacent light source 102 and positioned for viewing through reflector 114 along optical axis 116 coincident with focal axis 108.

What I claim is:

1. An optical system for use in an instrument for the coincident illumination and viewing of an area comprising:
   a. a light source;
   b. a focusing reflector positioned adjacent said light source and formed to produce a beam of light to be directed on said area;
   c. optical viewing means having a portion thereof disposed on the focal axis of said beam, said portion being formed and positioned to enable viewing of said area from a position outside said beam with the optical axis of said viewing means coincident with said focal axis of said beam; and
   d. a reinforcing reflector disposed opposite said focusing reflector and between said axially disposed portion of said viewing means and said light source adjacent said light source with a reflective side thereof facing said light source, said reinforcing reflector being formed to reflect a portion of the light emitted from said light source into said focusing reflector and to prevent the emission of light from said light source in a direction substantially transverse to said beam.

2. An optical system as defined in claim 1 wherein said viewing means is formed with two side-by-side reflective areas disposed on either side of the focal axis of said beam and positioned and extending to enable viewing of said area along spaced-apart substantially parallel optical axes, and said viewing means is additionally provided with two reflecting surfaces outside said beam and respectively optically aligned with said side-by-side reflective areas in order to enable binocular viewing of said area coincident with said beam.

3. An optical system for use in an instrument for the illumination and viewing of an area comprising:
   a. a light source;
   b. a focusing reflector positioned adjacent to said light source and formed to produce a beam of light to be directed on said area;
   c. optical viewing means having a portion disposed on the focal axis of said beam for viewing coincident with said focal axis over a substantial depth of field and a second portion disposed outside said beam, said second portion being formed for position in optical alignment with said portion within said beam and said second portion being further formed for viewing coincident with said beam from a position behind said light source and focusing reflector and coaxial with said focal axis to give the appearance of viewing through said light source and reflector.

4. An optical system for use in an instrument for the illumination and viewing of an area comprising:
   a. a light source;
   b. a focusing reflector positioned adjacent said light source and formed to produce a beam of light to be directed on said area; and
   c. optical viewing means having a portion thereof disposed on a focal axis of said beam, said portion being formed to enable viewing of said area from a position outside said beam and further being formed as two side-by-side reflector surfaces disposed on either side of the focal axis of said beam and positioned for substantially coincident binocular viewing of said area.